Sept. 22, 1970 W. GANTER ET AL 3,529,414

TUNING FORK DEVICE

Original Filed June 1, 1966

INVENTORS
Wolfgang Ganter
Friedrich Assmus

BY
Watson, Cole, Grindle & Watson,
Attys.

United States Patent Office 3,529,414

Patented Sept. 22, 1970

3,529,414

TUNING FORK DEVICE

Wolfgang Ganter, Heiligenbronnerstrasse 52, Schramberg, Sulgen, Germany, and Friedrich Assmus, Schillerstrasse 6, Schramberg, Wurttemberg, Germany Original application June 7, 1966, Ser. No. 555,766, now Patent No. 3,456,137, dated July 15, 1969. Divided and this application Apr. 15, 1969, Ser. No. 816,264
Claims priority, application Germany, June 8, 1965, J 28,304
Int. Cl. G04c 3/00
U.S. Cl. 58—23 1 Claim

ABSTRACT OF THE DISCLOSURE

A tuning fork for us as a movement regulating oscillator for time-keeping devices having a coil arrangement of which one is a control coil and the other a driving coil, both coils being coaxially arranged and associated with a housing like magnet arrangement with return elements running parallel to the plane of oscillation.

This application is a division of co-pending application Ser. No. 555,766, filed June 7, 1966, which is now Pat. No. 3,456,137, granted July 15, 1969.

The invention relates to a tuning fork kept in vibration in an electromagnetic manner, preferably as a movement regulating oscillator, for time-keeping devices with a housing-type magnet arrangement with a largely closed magnetic path and with a coil arrangement. The latter consists preferably of a control coil and a driving coil, in the input or the output circuit of an electronic amplifier circuit, especially a semi-conductor amplfier circuit, which is exposed with the aid of the vibrating tuning fork to a changing magnetic flux.

A tuning fork arrangement held in vibration in an electromagnetic manner has been known, where a fixed framelike element of ferromagnetic material has been provided, which contains two permanent magnets by means of which core-like parts oppose each other leaving an air gap between them, and of which one carries the coil arrangement, are premagnetized. The prongs of the tuning fork project into the air gap of the premagnetized frame and during their vibration cause a periodic change in the magnetic flux permeating the air gap and thus also the coil arrangement arranged on the core-like element. In this case the arrangement of the coils on a premagnetized core-like element is disadvantageous since forces of attraction of varying magnitude are exerted on the tuning fork, as a result of which the isochronism of the vibrating tuning fork will be disturbed.

The invention has an object of creating a tuning fork held in vibration in an electromagnetic manner, which is suitable as a movement regulating oscillator for time-keeping devices, especially watches and clocks, and which can also be inserted into watches of small dimensions. The invention has been characterized by the fact, that the magnet arrangement consists of permanent magnets arranged at the ends of the prongs of the tuning fork, and magnetized perpendicularly in relation to the plane of oscillation, in that the coil arrangement consists of coaxially arranged coreless flat coils and in that the housing-like magnet arrangement has return elements running parallel to the plane of oscillation and opposite the magnet poles directed toward the coil arrangement. As a result thereof, a tuning fork of a very flat design is created which is not disturbed by magnetic retracing forces in its oscillation.

At the ends of the prongs of the tuning fork, U-shaped return brackets can be arranged, each of which is applied to a pole of the magnet arrangement facing away from the coil arrangement and encircles one side of the arrangement. A fixed magnetic return element can also be provided, in which the coils have been arranged in planes parallel to the plane of oscillation of the prongs of the tuning forks at both sides of at least one prong of a tuning fork.

Further objects will be apparent from the description when considered in connection with the accompanying drawing in which.

Figure 1:
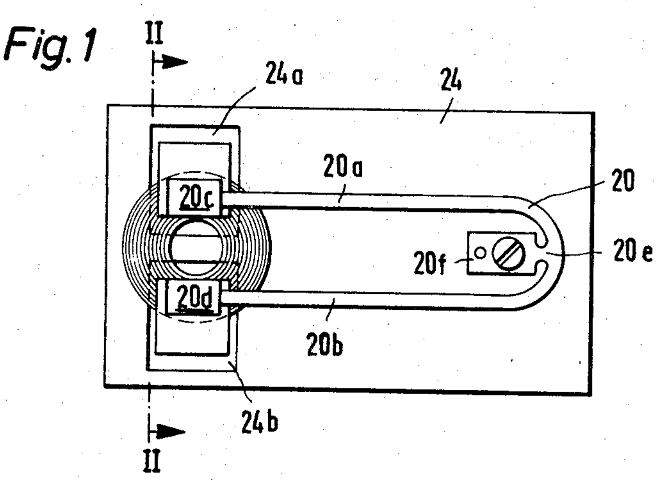
FIG. 1 is a top plan view showing a first embodiment of the invention by way of example, where the ends of the prong of the tuning fork carry permanent magnets with return elements encircling the coils.
Figure 2:
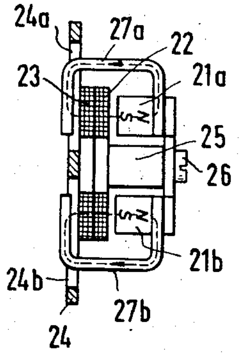
FIG. 2 is a cross-section taken on the line II—II in FIG. 1 in the direction of the arrows.

In FIGS. 1 and 2, numeral 20 designates a tuning fork whose bridge elements 20*e* is attached to a base plate 24 with the aid of a part 20*f*, being connected with said bridge, as well as of an intermediate element 25 and a screw 26, FIG. 2. The prongs 20*a* and 20*b* of the tuning fork 20 have end pieces 20*c* and 20*d* to which the permanent magnets 21*a* and 21*b* have been attached, which are magnetized perpendicularly in relation to the plane of oscillation of the prongs 20*a* and 20*b* of the tuning fork. At the ends of the prongs of the tuning fork, U-shaped return brackets 27*a* and 27*b* have been attached, which fit against the poles of the permanent magnets 21*a* and 21*b*, facing away from the coil arrangement 22 and 23. These return elements each time encircle one side of the coil arrangement consisting of the two coaxial coils 22 and 23 and they bring about a largely closed magnetic circuit.

The coil arrangement 22 and 23 has been placed on the base plate 24, which has two perforations 24*a* and 24*b*, through which the return brackets 27*a* and 27*b* project. In the example described, it will not be necessary for the base plate and the tuning fork to consist of ferromagnetic material.

Figure 3:
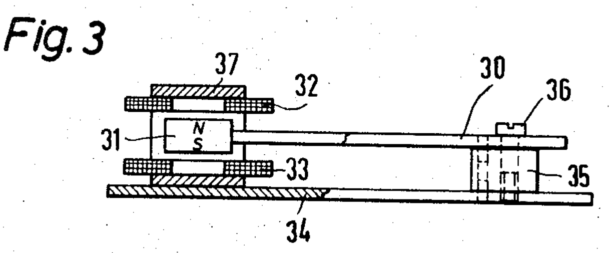
FIG. 3 is a part section and a side view showing a second embodiment of the invention by way of example, with a fixed return element in a longitudinal section taken on the line III—III in FIG. 4, in the direction of the arrows.
Figure 4:
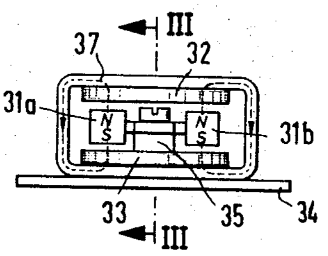
FIG. 4 is a front view of the embodiment in accordance with FIG. 3.

In FIGS. 3 and 4, the numeral 30 designates a tuning fork, the prongs of which, at their ends, carry permanent magnets 31*a* and 31*b*, which are magnetized perpendicularly in relation to the plane of oscillation of the prongs of the tuning fork. The tuning fork 30 is attached to a baseplate 34 with is bridge by means of a distancing element 35 and a screw 36, which base plate in the area of the ends of the tuning fork carries a housing-like return element 37 in which coils 32 and 33 have been arranged fixedly at both sides of the permanent magnets 31*a* and 31*b*. FIG. 4 shows the course of the magnetic flux in broken lines. A strongly closed magnetic circuit results with small oscillating masses.

The embodiments shown and given by way of example are arrangements of tuning forks with a relatively low constructional height, which operate with a high degree of effectiveness and thus are especially suited for battery operated watches of a small size.

We claim:

1. A tuning fork arrangement for use in a time-keeping device, comprising a tuning fork having two parallel tines with permanent magnet mounted on each free end thereof, each of said permanent magnets magnetized in a direction perpendicular to the direction of oscillation of said tines, a base plate lying in a plane parallel to the plane said tines, means perpendicular to said plate and said plane and fixedly connecting said plate and said fork at the end of the lines opposite the free ends of said tines, two apertures in the said plate each of which lies opposite said free ends, a coil assembly consisting of a pickup and a drive coil of an electronic amplfier circuit coaxially mounted on said plate, surfaces of said assembly at opposite ends of a diameter along said assembly lying opposite said aperture, two U-shaped return brackets, each of which has two parallel legs lying in a plane parallel to the direction of oscillation of said tines wherein one of said legs is mounted on a respective tine and the other of said leg lies within said aperture and whereby a largely closed magnetic path is maintained through each set of permanent magnet, bracket, aperture and portion of coil assembly.

References Cited

FOREIGN PATENTS 1,090,564 2/1963 France.

RICHARD B. WILKINSON, Primary Examiner

E. C. SIMMONS, Assistant Examiner

U.S. Cl. X.R.

310—25